US012693571B2

(12) United States Patent
Fathololoumi et al.

(10) Patent No.: US 12,693,571 B2
(45) Date of Patent: Jul. 28, 2026

(54) TUNABLE CASCADED MACH-ZEHNDER INTERFEROMETER STRUCTURES

(71) Applicant: Intel Corporation, Santa Clara, CA (US)

(72) Inventors: Saeed Fathololoumi, Los Gatos, CA (US); David Chak Wang Hui, Santa Clara, CA (US); Monireh Moayedi Pour Fard, Austin, TX (US); Jacob Levy, Sierra Madre, CA (US)

(73) Assignee: Intel Corporation, Santa Clara, CA (US)

( * ) Notice: Subject to any disclaimer, the term of this patent is extended or adjusted under 35 U.S.C. 154(b) by 273 days.

(21) Appl. No.: 18/399,499

(22) Filed: Dec. 28, 2023

(65) Prior Publication Data

US 2025/0216187 A1     Jul. 3, 2025

(51) Int. Cl.
| | |
|---|---|
| *G02F 1/21* | (2006.01) |
| *G01B 9/02* | (2022.01) |
| *G01B 9/02001* | (2022.01) |
| *G02B 6/293* | (2006.01) |
| *G02F 1/01* | (2006.01) |
| *G02F 1/225* | (2006.01) |

(52) U.S. Cl.
CPC ........... *G02F 1/212* (2021.01); *G01B 9/0201* (2013.01); *G01B 9/02049* (2013.01); *G02B 6/29355* (2013.01); *G02F 1/0123* (2013.01); *G02F 1/0147* (2013.01); *G02F 1/225* (2013.01)

(58) Field of Classification Search
CPC ...... G02F 1/0123; G02F 1/0147; G02F 1/212; G02F 1/225; G02B 6/29355; G01B 9/0201; G01B 9/02049
See application file for complete search history.

(56) References Cited

U.S. PATENT DOCUMENTS

| | | | | |
|---|---|---|---|---|
| 7,340,114 B2 * | 3/2008 | Doi | ......................... | G02F 1/225 |
| | | | | 385/39 |
| 12,181,709 B2 * | 12/2024 | Melikyan | .................. | G02F 1/21 |
| 2001/0024537 A1 * | 9/2001 | Tabuchi | .................. | G02F 1/225 |
| | | | | 385/39 |
| 2019/0235285 A1 * | 8/2019 | McGreer | ............... | G02F 1/2257 |
| 2023/0288635 A1 | 9/2023 | Dong et al. | | |

OTHER PUBLICATIONS

Extended European Search Report from European Patent Application No. 24214442.6 notified Apr. 30, 2025, 10 pgs.
Li, et al., "On-Chip Photonic Microsystem for Optical Signal Processing Based on Silicon and Silicon Nitride Platforms", De Gruyter, Adv. Opt. Techn. 2018; 7(1-2); 81-101, 21 pgs.
Ning, et al., "Comparison of Silicon Lattice-Filter-Based O-Band 1 x 8 (De)Multiplexers With Flat and Gaussian-Like Passbands", IEEE Photonics Journal, vol. 14, No. 2, Apr. 2022, 5 pgs.
Syahriar, et al., "Temperatures Effects on Cascaded Mach-Zehnder Interferometer Structures", Bulletin of Electrical Engineering and Informatics; vol. 9, No. 6, Dec. 2020, pp. 2427-2435, 9 pgs.

* cited by examiner

*Primary Examiner* — Daniel Petkovsek
(74) *Attorney, Agent, or Firm* — Essential Patents Group, LLP

(57) ABSTRACT

Cascaded Mach-Zehnder Interferometer (CMZI) structures comprising electrically resistive heaters provisioned across the stages so as to enable improved filter wavelength control. In embodiments, CMZI heater power supply control is made a linear function by scaling the number of heater elements between the stages in proportion with the magnitude of the arm differential (e.g., $\Delta L$, $2\Delta L$) for the corresponding stage.

15 Claims, 7 Drawing Sheets

TUNABLE CASCADED MACH-ZEHNDER INTERFEROMETER STRUCTURES

BACKGROUND

Many computing applications, such as machine learning (ML), can be enhanced through higher bandwidth communication between compute resources. Photonic integrated circuits (PICs) are increasingly important in high-performance computing, data center, and cloud computing applications. Dense wavelength division multiplexing (DWDM) offers viable solutions toward scaling up and scaling out computation resources as well as enabling the disaggregation of such computation resources.

The use of silicon in photonics, enables high-volume, low-cost and highly integrated PICs. Wavelength filters, such as optical finite impulse response (FIR) filters are critical in silicon PIC development, particularly for applications relying on DWDM. Commonly implemented optical filters include arrayed waveguide gratings (AWGs), planar concave gratings (PCGs), micro-ring resonators (MRRs), and cascaded Mach-Zehnder interferometer (CMZI) structures. Compared with AWG and PCG architectures, CMZI structures offer a number of advantages, such as lower insertion loss, and a flatter transmission passband.

The transmission function of a CMZI filter is a function of the differential path lengths of the two optical waveguide paths (arms) of the imbalanced MZIs in each stage. Electrical circuits controlling resistive heaters thermally coupled to the arms of CMZI structures enable filter tuning through the thermo-optic effect to modulate the phase difference of the two arms of each stage. Such a multistage cascaded MZI-based filter is operative as programmable FIR processor. FIR tuning may be performed to suite a variety of applications, one example being passband filter operation that is substantially athermal.

Optical phase control of each MZI switch within a CMZI is proportional to the arm length difference ($\Delta L$). For example, the change in phase/heater power of a switch stage with twice $\Delta L$ should be twice the change in phase/heater power of a switch stage with $\Delta L$. However, resistive heater power has a quadratic relationship with resistance, so heater power control circuitry can become relatively complicated. For example, CMZI phase control typically requires reading both voltage and current of a resistive heater and accordingly adjusting bias voltage(s) by electronic circuitry or a microcontroller to arrive at a desired heater output power. Control of an optical filter can therefore be power intensive and require control circuitry that can scale quickly for higher order optical filters. CMZI structures amenable to improved and/or simplified wavelength filter control algorithms are therefore commercially advantageous.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
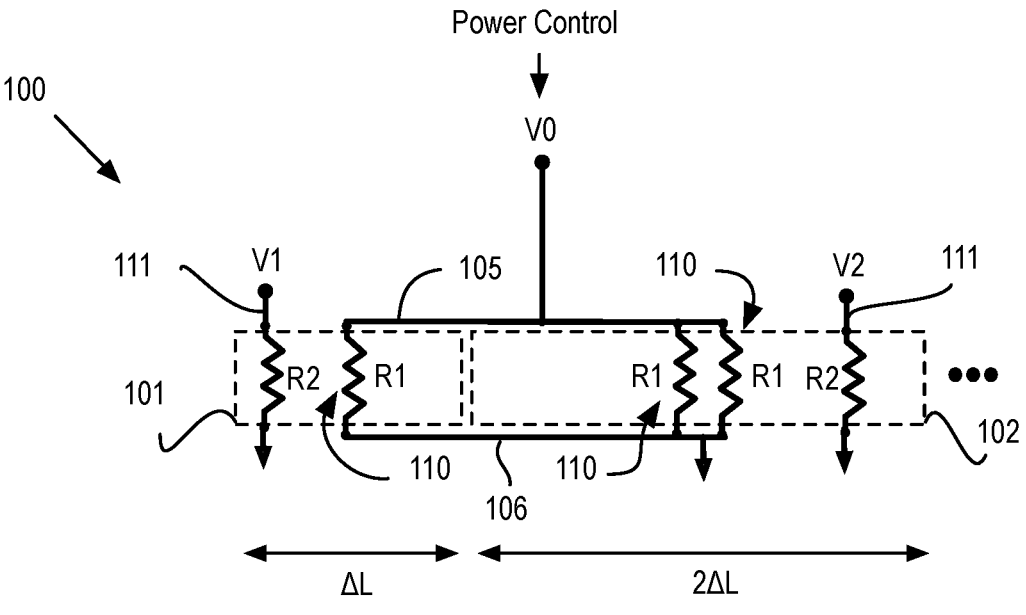
FIG. 1 is a schematic of tunable CMZI architectures, in accordance with some embodiments.

Embodiments are described with reference to the enclosed figures. While specific configurations and arrangements are depicted and discussed in detail, this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications other than what is described in detail herein.

Reference is made in the following detailed description to the accompanying drawings, which form a part hereof and illustrate exemplary embodiments. Further, it is understood that other embodiments may be utilized and structural and/or logical changes may be made without departing from the scope of claimed subject matter. It should also be noted that directions and references, for example, up, down, top, bottom, and so on, may be used merely to facilitate the description of features in the drawings. Therefore, the following detailed description is not to be taken in a limiting sense and the scope of claimed subject matter is defined solely by the appended claims and their equivalents.

In the following description, numerous details are set forth. However, it will be apparent to one skilled in the art, that embodiments may be practiced without these specific details. In some instances, well-known methods and devices are shown in block diagram form, rather than in detail, to avoid obscuring the embodiments. Reference throughout this specification to "an embodiment" or "one embodiment" or "some embodiments" means that a particular feature, structure, function, or characteristic described in connection with the embodiment is included in at least one embodiment. Thus, the appearances of the phrase "in an embodiment" or "in one embodiment" or "some embodiments" in various places throughout this specification are not necessarily referring to the same embodiment. Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

As used in the description and the appended claims, the singular forms "a", "an" and "the" are intended to include the plural forms as well, unless the context clearly indicates otherwise. It will also be understood that the term "and/or"

as used herein refers to and encompasses any and all possible combinations of one or more of the associated listed items.

The terms "coupled" and "connected," along with their derivatives, may be used herein to describe functional or structural relationships between components. These terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical or electrical contact with each other, and/or that the two or more elements co-operate or interact with each other (e.g., as in a cause-and-effect relationship).

The terms "over," "under," "between," and "on" as used herein refer to a relative position of one component or material with respect to other components or materials where such physical relationships are noteworthy. For example, in the context of materials, one material or layer over or under another may be directly in contact or may have one or more intervening materials or layers. Moreover, one material between two materials or layers may be directly in contact with the two materials/layers or may have one or more intervening materials/layers. In contrast, a first material or layer "on" a second material or layer is in direct contact with that second material/layer. Similar distinctions are to be made in the context of component assemblies.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

FIG. 1 is a schematic of a cascaded Mach-Zehnder interferometer filter structure 100 in accordance with embodiments herein. CMZI structure 100 includes a first MZI stage 101 and a serial second MZI stage 102. Although two serial stages are illustrated, exemplary three serial stage CMZI structures are further described below in the context of FIG. 3 to illustrate how the general architecture illustrated in FIG. 1 can be scaled. A similar strategy may be applied to CMZI structures of any number of n serial stages. The architecture illustrated in FIG. 1 may also be applied to various binary cascading architectures, for example within a CMZI lattice filter.

MZI stage 101 comprises an imbalanced MZI with two optical waveguide paths (i.e., arms) having a differential length $\Delta L$. The differential length $\Delta L$ induces an incremental phase shift, which may vary (e.g., $\pi/4$, $\pi/2$, $\pi$, etc.) according to design. MZI stage 102 similarly comprises an imbalanced MZI. However, the two arms have a proportionally larger differential length of twice $\Delta L$ ($2\Delta L$) to induce twice the incremental phase shift of stage 101.

In accordance with exemplary embodiments, CMZI heater power supply control is made a linear function by scaling the number of electrically resistive heater elements 110 between the stages 101, 102 in proportion with the magnitude of the arm differential (e.g., $\Delta L$, $2\Delta L$) for the corresponding stage. Across the n stages of CMZI 100, all heater elements (units) 110 have substantially the same predetermined resistance (R1) value to dissipate through Joule heating a power suitable for applying a thermo-optic control effort to CMZI structure 100. In the illustrated example, a single heater element 110 is coupled to stage 101, which has an arm differential of $\Delta L$. Stage 102, with twice the arm differential of $2\Delta L$, is thermally coupled to twice the number of heater elements 110 (i.e., two heater elements 110). Within stage 102, the pair of heater elements 110 are electrically interconnected in electrical parallel across a first heater supply rail 105 and a second heater supply rail 106. Heater element 110 within stage 101 is similarly electrically connected across supply rails 105, 106.

Instead of controlling a same number heater elements in different stages to dissipate different powers, embodiments herein physically provision a proportionate number of heater elements across CMZI stages so that all heater elements can be controlled to each dissipate substantially the same power, for example with a linear control voltage V0 that is applied across multiple stages of the CMZI filter structure, simplifying the tuning of CMZI structure 100.

In accordance with some further embodiments, CMZI structure 100 also includes secondary electrically resistive heater elements 111 in addition to primary heater elements 110. In exemplary embodiments, each MZI stage includes one secondary resistive heater unit 111. Secondary heater elements 111 may implement filter stage offsets to account for phase errors in each MZI that are substantially constant (e.g., temperature independent), such as those stemming from fabrication non-idealities (e.g., waveguide sidewall roughness, etc.). Such fixed phase errors may be relatively small and therefore resistive heater elements 111 may have a resistance value R2 that is significantly smaller than resistance R1 of primary heater elements 110. The secondary heater elements of each MZI stage 101, 102 may be substantially the same resistance value, and may each be independently driven by a bias voltage V1, V2 supply to minimize any phase error that would otherwise be associated with that stage.

Figure 2:
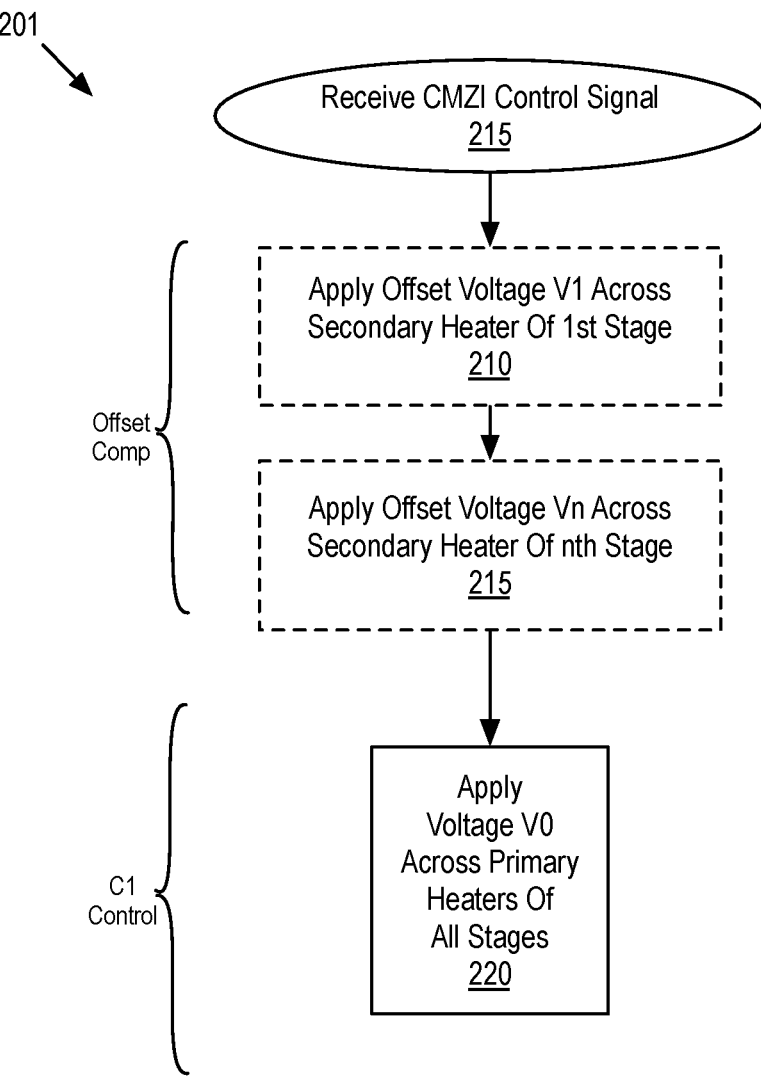
FIG. 2 is a flow diagram of CMZI heater control methods, in accordance with some embodiments.

FIG. 2A is a flow diagram of CMZI heater control methods 201, in accordance with some embodiments. Methods 201 may be practiced on CMZI structure 100, for example. Methods 201 begin with receiving a CMZI control signal at input 215. The control signal may originate from any feedback or feedforward source. A feedback source may, for example, be sensitive to a transmission spectral response of a CMZI filter. In some exemplary embodiments, the CMZI control signal is associated with, or indicative of, a magnitude of residual transmission power collected downstream of the CMZI filter. For example, output of the CMZI filter may be passed through an optical add/drop filter with transmission power falling outside of the wavelength(s) selected by the add/drop further conveyed to a termination photo detector (PD). Output of the PD may then dictate the CMZI control signal input to methods 201. In some other embodiments, the CMZI control signal is associated with, or indicative of a temperature differential $\Delta T$ from a predetermined reference temperature. CMZI control signal input to methods 201 may then be derived from a magnitude and sign of the temperature difference.

Methods 201 continue with optional stage offset compensation at blocks 210 and 215 where an offset for each MZI stage of a CMZI is optimized based on the CMZI control signal received at input 215. Blocks 210 and 215 are illustrated in dashed line to emphasize these blocks are optional and, if implemented, are advantageously practiced once, for example at the time of final test following device assembly, and not subsequently varied during field operation of a CMZI.

At block 210, a bias voltage V1 is applied across a secondary resistive heater element that is thermally coupled primarily to a first imbalanced MZI stage. As further described below, this secondary resistive heater element is thermally coupled primarily to either a short arm or a long arm of an imbalanced MZI structure. Bias voltage V1 may be varied to dissipate more or less power in a secondary heater element altering phase delay of the stage, for example to converge on a minimum in residual transmission power. Bias voltage V1 may be varied separately or in concert with any other phase adjustments of a CMZI structure.

At input 215, a bias voltage Vn is applied across a secondary resistive heater element that is thermally coupled primarily to an $n^{th}$ imbalanced MZI stage. As further described below, this secondary resistive heater element is thermally coupled primarily to either a short arm or a long arm of an imbalanced MZI structure. Bias voltage Vn may be varied to dissipate more or less power in a secondary heater element altering phase delay of the stage, for example to converge on a minimum in residual transmission power. Bias voltage Vn may be varied separately or in concert with any other phase adjustments of a CMZI structure.

Methods 201 continue at block 220 where a primary control (C1) effort is modulated by varying (e.g., linearly) a primary CMZI supply voltage (V0) across all primary heater elements of all imbalanced MZI structures within a particular CMZI architecture. Block 220 may be practiced in the field during operation of any optical device hosing the CMZI structure. Voltage V0 may be varied, for example, to compensate temperature dependent phase changes experienced during device operation in a given operating environment such that at least one of passband centering, crosstalk isolation, or passband ripple of the CMZI filter is rendered substantially athermal.

For adjusting phase in a first direction, primary heater supply voltage V0 may be applied at block 220 across a first pair of heater supply rails. Primary resistor elements coupled to a first arm of an imbalanced MZI structure of all n stages of the CMZI are coupled in electrical parallel to the first pair of heater supply rails. For embodiments, where phase is also adjustable in an opposite direction, primary heater supply voltage V0 may be applied at block 220 across a second pair of heater supply rails. A second set of primary resistor elements coupled to a second arm of the imbalanced MZI structure of all n stages of the CMZI are coupled in electrical parallel to the second pair of heater supply rails. A selection between alternative supply rails may be based on, for example, whether the CMZI temperature is above or below a predetermined reference temperature (i.e., whether $\Delta T$ is positive or negative).

Figure 3:
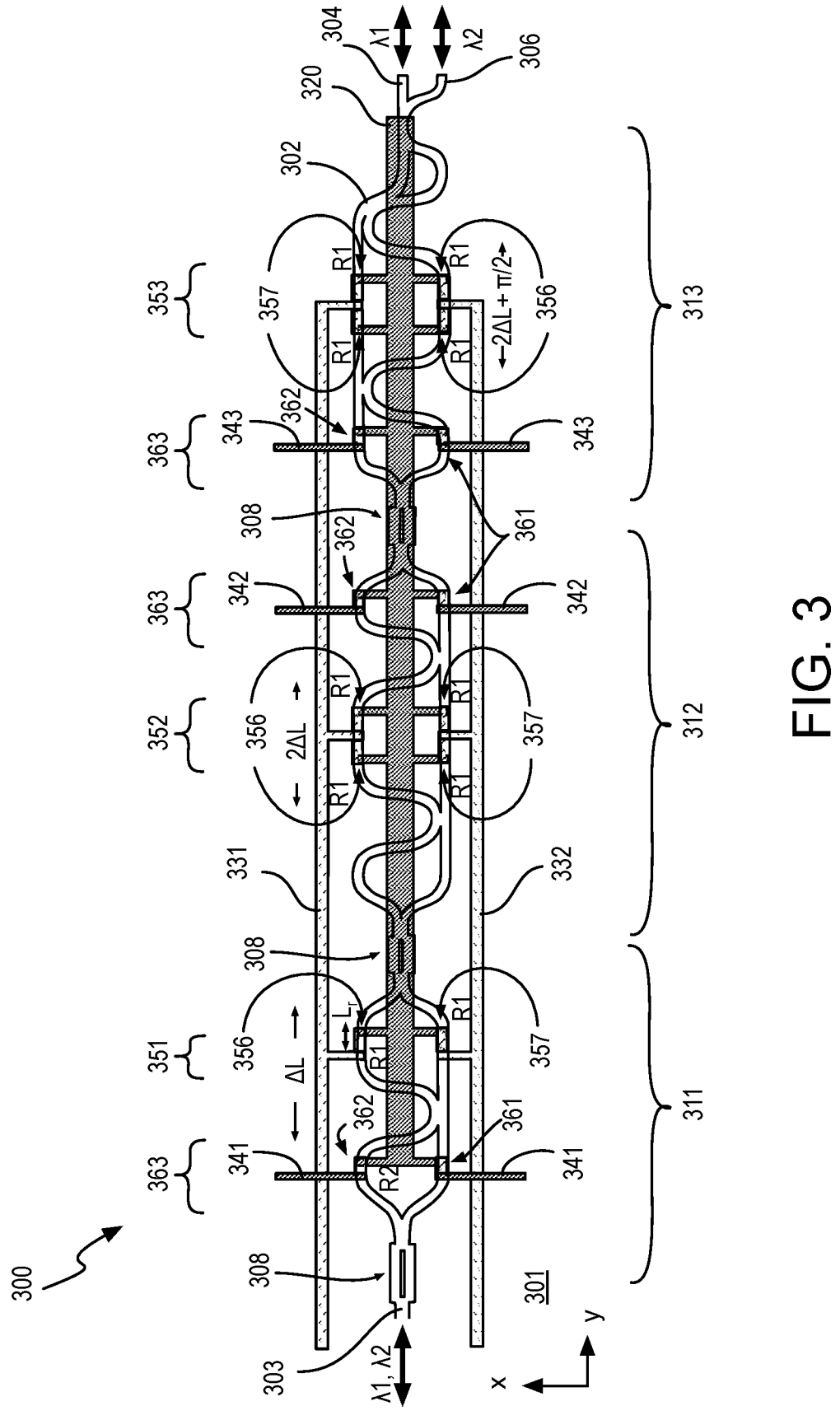
FIG. 3 is a plan view of a tunable three stage CMZI interleaver, in accordance with some embodiments.

Although CMZI the architecture illustrated in FIG. 1 and the control methods illustrated 2 may be applied to a wide variety of CMZI structures, FIG. 3 illustrates a plan view of a tunable three stage CMZI interleaver 300, in accordance with some exemplary embodiments.

CMZI interleaver 300 is over a substrate 301. Substrate 301 may have any composition suitable for the fabrication of planar optical waveguides 302. In advantageous embodiments, substrate 301 comprises one or more layers of silicon. Substrate 301 may include a device material layer of substantially pure monocrystalline silicon and waveguides 302 may be defined from at least a portion of the device material layer, which in some embodiments is a top layer of a semiconductor-on-insulator (SOI) substrate material stack further comprising an underlying insulator material layer. In exemplary embodiments, where the device material layer is substantially pure silicon, the insulator material is advantageously predominantly silicon and oxygen (e.g., $SiO_2$). One or more additional substrate material layers may be under, or on a back side of, the insulator material layer as mechanical support. For example, bulk silicon of any thickness (e.g., 20-500 μm) may on the back side of the insulator material. Substrate 301 may alternatively include other materials, such as a monolithic glass layer. Waveguides 302 may also comprise a material other than pure silicon, such as, but not limited to silicon nitride (e.g., $Si_3N_4$).

CMZI interleaver 300 comprises a first imbalanced MZI stage 311 optically coupled in series to a second imbalanced MZI stage 312, which is further optically coupled in series to a third imbalanced MZI stage 313. Each serial stage 311-313 is coupled through an optical coupler 308. In the illustrated example, each optical coupler 308 is a multimode interference (MMI) coupler, each of which may have any suitable splitting ratio.

CMZI interleaver 300 is operable to demultiplex a signal comprising multiple wavelengths 21, 22 input to port 303 of MZI stage 311 and output as separate signals of one wavelength 21 or 22 from two ports 304, 306 of MZI stage 313. As a reciprocal device, CMZI interleaver 300 is further operable to multiplex two signals of one wavelength 21 or 22 received at ports 304, 306 into one signal comprising multiple wavelengths 21, 22 output from port 303. For (de) interleaver function, MZI stage 311 is a $\pi$ switch including a first pair of waveguides having optical path length (arm) difference of $\Delta L$. MZI stage 312 is a $2\pi$ switch having pairs of waveguides with an arm differential of $2\Delta L$. The second $2\pi$ switch stage 313 has an arm differential of $2\Delta L$ summed with a length that induces an additional $\pi/2$ phase shift (i.e., $2\Delta L + \pi/2$) and is inverted from stage 312.

General control equations for CMZI interleaver 300 can be formulated as:

$$C1 = \frac{P1 + \frac{P2 - P3}{2}}{3}; \tag{1}$$

$$C2 = \frac{2P1 + P2 + 2P3}{3}; \text{ and} \tag{2}$$

$$C3 = \frac{2P1 - 2P2 - P3}{3}, \tag{3}$$

where P1, P2 and P3 are power values to be applied to each of stages 311, 312 and 313 to exert control C1 over filter passband centering, control C2 over filter crosstalk isolation and control C3 over filter passband ripple. Eqs. (1)-(3) may be rewritten for powers P1-P3 in terms of a reference power P:

$$P1 = \left(C1 + \frac{C2 + C3}{2}\right) * P; \tag{4}$$

$$P2 = (2C1 - C3) * P; \text{ and} \tag{5}$$

$$P3 = (C2 - 2C1) * P. \tag{6}$$

Together, equations (4)-(6) can be further simplified in terms of only C1:

$$P1 = P(C1) + \text{Stage1\_Power\_Offset}; \tag{7}$$

$$P2 = 2P(C1) + \text{Stage2\_Power\_Offset}; \text{ and} \tag{8}$$

$$P3 = -2P(C1) + \text{Stage3\_Power\_Offset}. \tag{9}$$

Accordingly, if all heater elements are fabricated to have substantially the same power rating, provisioning twice the heaters for the $2\pi$ switch stages 312 and 313 than for the $\pi$ switch stage 311 allows a same heater control voltage to be applied to all heaters in electrical parallel.

MZI stage 311 therefore includes one primary electrical resistor element 356 adjacent to a waveguide of differential length ΔL while MZI stage 312 includes a pair of primary resistor elements 356 adjacent to a second waveguide of differential length 2ΔL. MZI stage 313 similarly includes a second pair of primary resistor elements 356 adjacent to a second waveguide of differential length 2ΔL+π/2. All primary resistor elements 356 have substantially the same resistance R1 to dissipate a same power at a given supply voltage. In advantageous embodiments where all the primary resistor elements 356 have substantially the same material composition (e.g., Ti, TiN, polysilicon, etc.) and therefore substantially the same sheet resistance, all primary resistor elements 356 having substantially the same resistor width (x-dimension) and thin film thickness will have the same resistor length $L_R$.

For phase control on either side of a target phase shift, MZI stage 311 further includes a primary resistor element 357 adjacent to the waveguide of any reference length. MZI stages 312 and 313 each include a matching pair of primary resistors 357 adjacent to the waveguide of a corresponding reference length. As primary resistors, resistors 357 also have substantially the same resistance R1 to dissipate at a same power rating. In advantageous embodiments where each of primary resistors 357 have substantially the same material composition as primary resistors 356, resistors 357 also have the same resistor length $L_R$. Hence, MZI stage 311 comprises primary resistor elements 351 including one balanced pair of primary resistor elements 356, 357. MZI stage 312 comprises primary resistor elements 352 consisting of a balanced pair of two primary resistor elements 356, 357. MZI stage 313 comprises primary resistor elements 353 similarly consisting of a balanced pair of two primary resistor elements 356, 357.

As further illustrated in FIG. 3, primary resistor elements 356 of MZI stages 311 and 312 are all connected in electrical parallel between a power supply reference rail 320 and a first power supply rail 331. Application of a primary heater control voltage across rails 320 and 331 therefore dissipates double the power within stages 312 and 313 as in stage 311. Primary resistor elements 357 are coupled in electrical parallel between reference rail 320 and a second power supply rail 331 to apply a balanced, complementary control effort. Application of a primary heater control voltage across rails 320 and 332 again dissipates double the power within stages 312 and 313 as in stage 311. MZI stage 313 is flipped relative to the others. With power equation (9) being negative, primary resistor elements 357 of MZI stage 313 are connected in electrical parallel between reference rail 320 and power supply rail 331 while primary resistor elements 356 of MZI stage 313 are connected in electrical parallel between reference rail 320 and power supply rail 332.

As noted above, secondary heater elements may be implemented to supplement control applied through the primary heater elements. Stage independent power offsets may be separately applied through different secondary heater driver circuits, supplementing the unified C1 power control that is applied to all stages concurrently through the primary heater driver circuit. For CMZI interleaver 300, each of MZI stages 311-313 includes secondary resistor element pairs 363. For each of MZI stages 311-313, secondary resistor elements 363 may be adjacent to any equal lengths of waveguide so as to not introduce any imbalance. Each secondary resistor element pair 363 defines one +/– power offset for the corresponding stage and includes a secondary resistor element 361 on a short arm and a complementary secondary resistor element 362 on a long arm. Resistor elements 361, 362 within one element pair 363 have approximately the same resistance value. Secondary resistor elements 361, 362 may all be matched across stages 311-313, but may also be different. Each of secondary resistor elements 361, 362 has one terminal coupled common power rail 320 and second terminals coupled a supply rail 341, 342 or 343, each of which is independently controllable to different voltages (e.g., V1, V2, V3) for the corresponding stage 311, 312 or 313.

Figure 4:
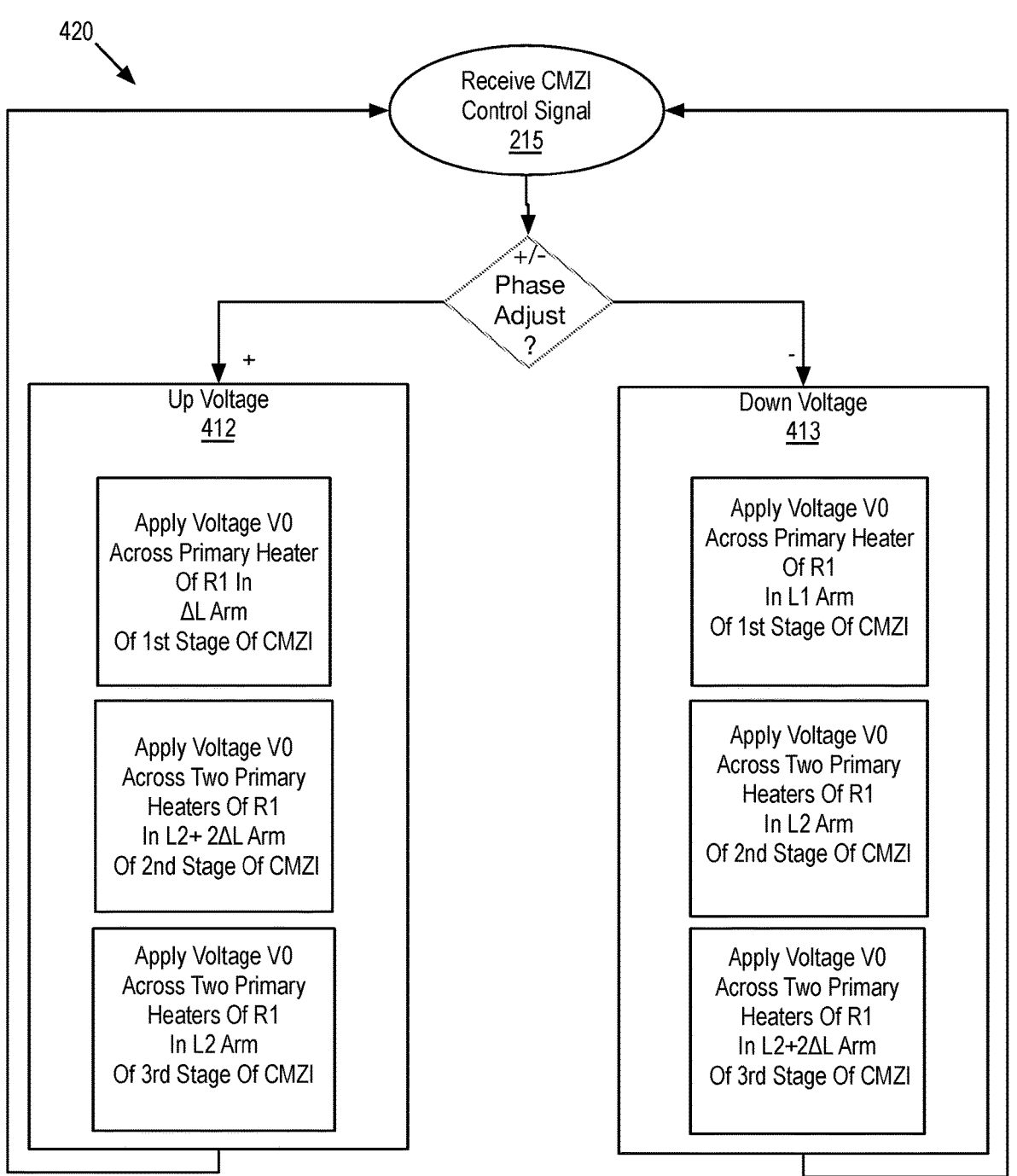
FIG. 4 is a flow diagram illustrating application of heater supply voltages to the CMZI interleaver illustrated in FIG. 3, in accordance with some embodiments.

FIG. 4 is a flow diagram illustrating methods 420 applying heater supply voltages to CMZI interleaver 300, in accordance with some embodiments. For methods 420, it is assumed any offset optimization has already been performed or no offset compensation is required. With center wavelength control linearized, methods 420 can be implemented by digital or analog circuitry. Methods 420 begin with receiving some control signal at block 210. For embodiments where methods 420 are practiced to achieve athermal filter performance, the control signal may, for example, be based on a system temperature differential ΔT.

For a temperature differential of a first signage (e.g., +), methods 420 continue with an up voltage control effort 412 where primary control voltage V0 is applied across a primary heater element of resistance R1 to heat a first stage MZI arm of length L1+ΔL. Primary voltage V0 is concurrently applied across two primary heater elements of resistance R1 to heat a second stage MZI arm of length L2+2ΔL. Primary voltage V0 is also concurrently applied across two primary heater elements of resistance R1 to heat a third stage MZI arm of length L2.

For a temperature differential of a second signage (e.g., –), methods 420 proceed with a down voltage control effort 413 where primary control voltage V0 is applied across a complementary primary heater element of resistance R1 to heat a first stage MZI arm of L1. Primary voltage V0 is concurrently applied across two primary heater elements of resistance R1 to heat a second stage MZI arm of length L2. Primary voltage V0 is also concurrently applied across two complementary primary heater elements of resistance R1 to heat a third stage MZI arm of 2L+2ΔL.

Figure 5:
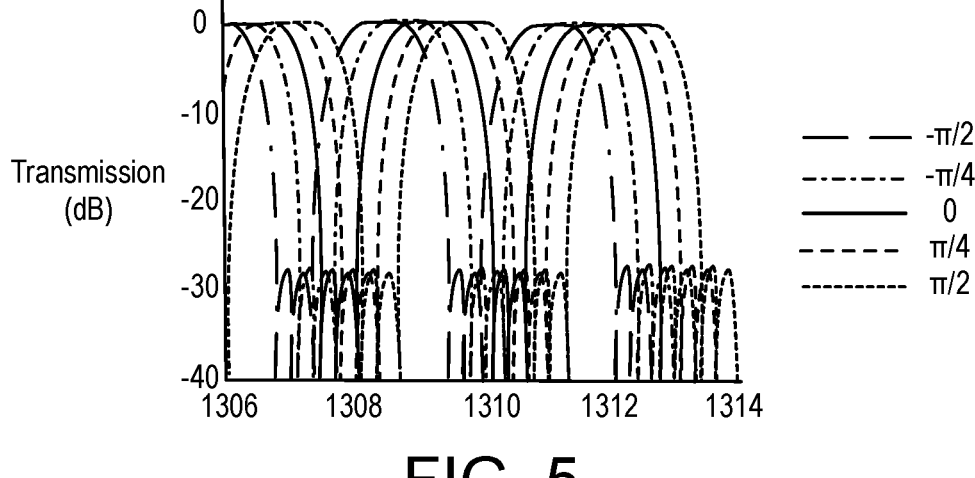
FIG. 5 illustrates a spectral response associated with the CMZI interleaver of FIG. 3, in accordance with some embodiments.

FIG. 5 illustrates a spectral response associated with the CMZI interleaver 300, in accordance with some embodiments that illustrate passband centering as function of phase increments between –π/2 and π/2. The control architecture and methods described above may accordingly tune filter performance through the application of control C1.

Figure 6:
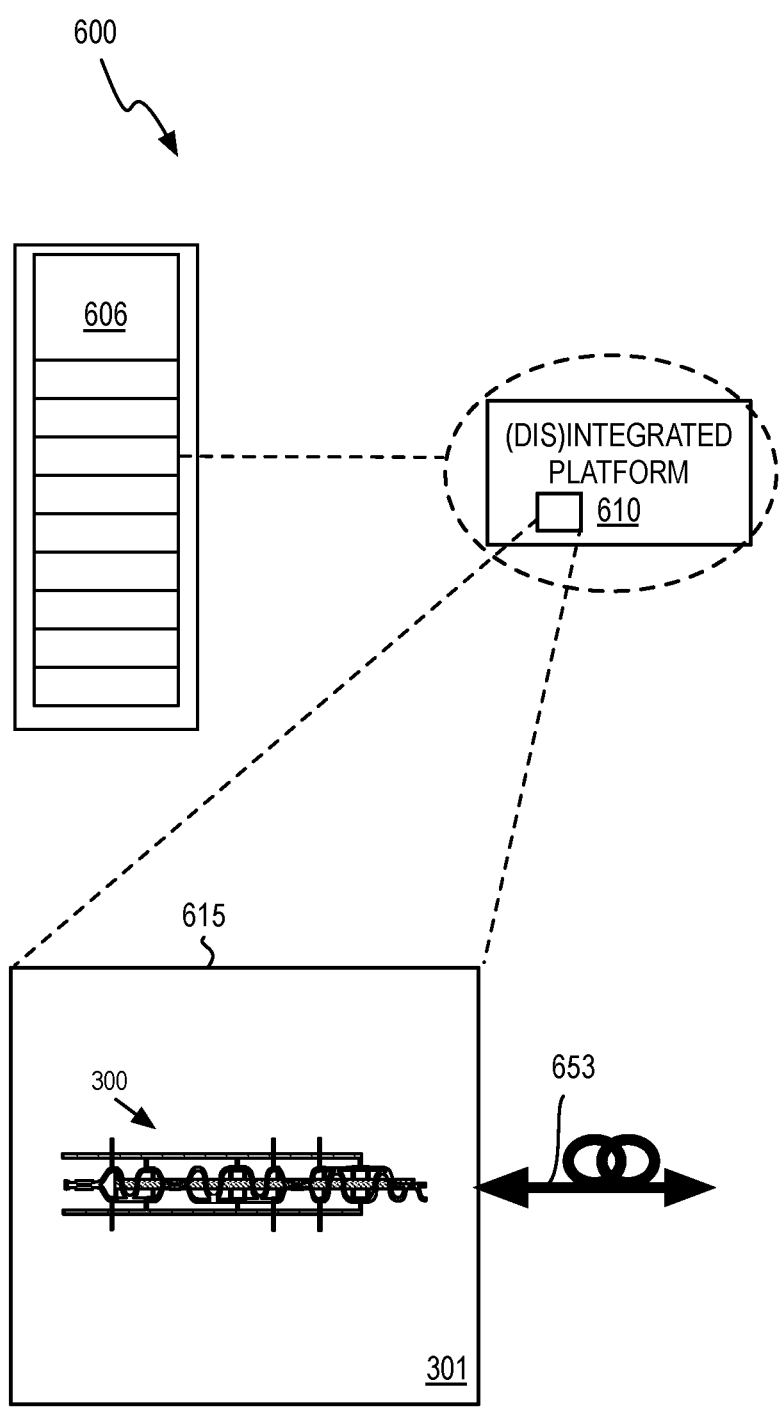
FIG. 6 is a schematic of a computer system comprising a silicon-based PIC including a tunable CMZI structure, in accordance with some embodiments.

CMZI structures and control circuitry described herein may be implemented in a wide variety of applications and platforms. FIG. 6 illustrates computation system 600. System 600 may comprise a commercial server 606, for example including any number of high-performance computing platforms disposed within a rack and networked together for electronic data processing. Computation system 600 may further comprise a plurality of compute units within a (dis) integrated platform 610, for example contained within server 606.

Platform 610 includes a silicon-based PIC 615. PIC 615 may be one of a plurality of PICS in platform 610, or a stand-alone packaged PIC. PIC 615 includes CMZI interleaver 300, for example including one or more of the features described elsewhere herein. PIC 615 may further include laser emitters, optical add/drop filters and any number of other passive and active optical devices. The optical beam process by PIC 615 may be coupled off-chip to an optical wire or fiber 653, for example through top-side coupling or edge coupling. Fiber 653 may further couple to one or more compute units (not depicted) or some other optical signal sink/source.

Figure 7:
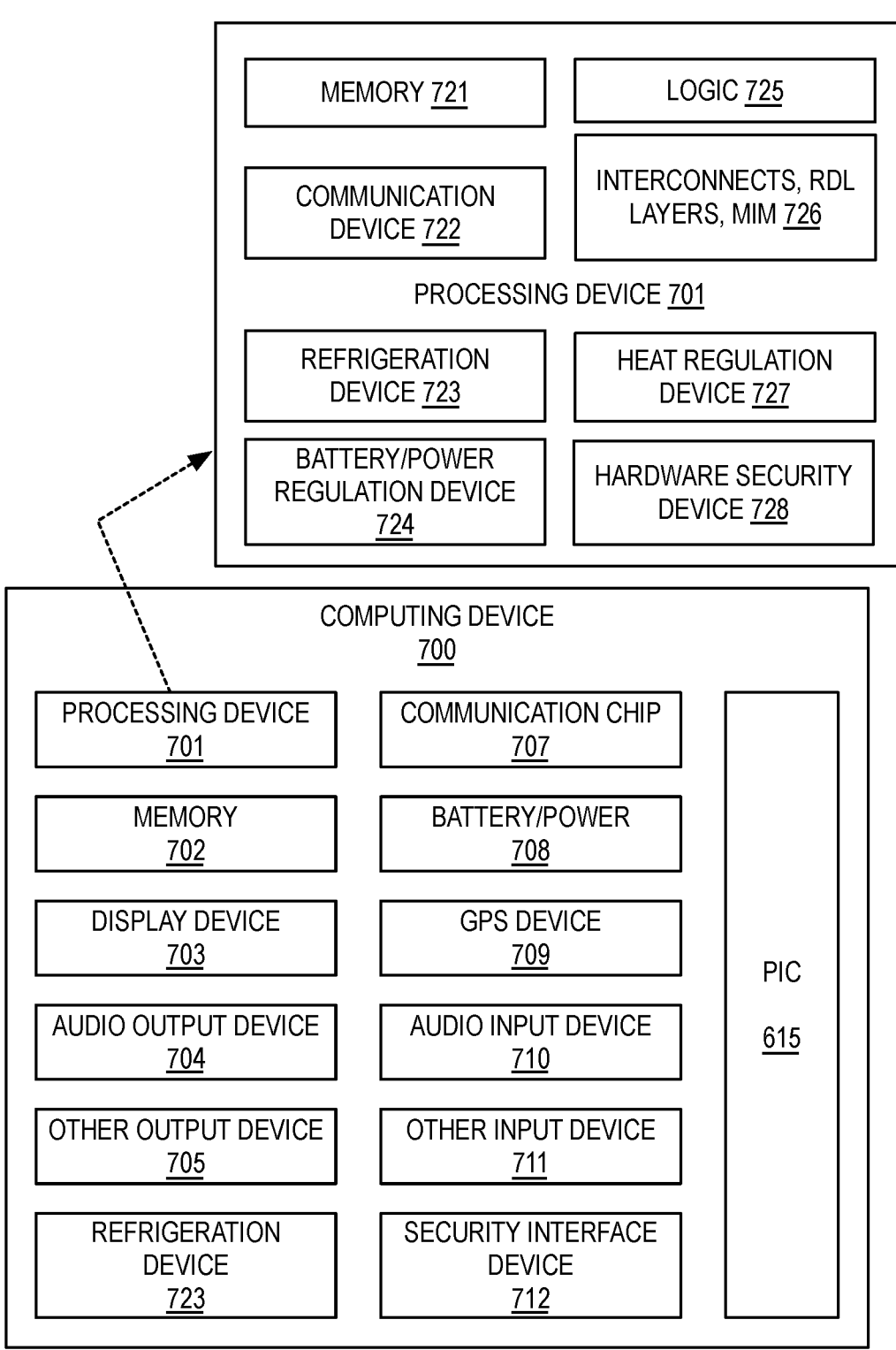
FIG. 7 is a functional block diagram of an electronic computing device, that may include one or more silicon-based PICs, in accordance with some embodiments.

FIG. 7 is a block diagram of a computing device 700 in accordance with some embodiments. For example, one or more components of computing device 700 may include any of the CMZI structures and/or control circuitry discussed elsewhere herein. A number of components are illustrated in FIG. 7 as included in computing device 700, but any one or more of these components may be omitted or duplicated, as suitable for the application. In some embodiments, some of the components included in computing device 700 may be attached to one or more printed circuit boards (e.g., a motherboard). In some embodiments, various ones of these components may be fabricated onto a single system-on-a-chip (SoC) die or implemented with a disintegrated plurality of chiplets or tiles packaged together. Additionally, in various embodiments, computing device 700 may not include one or more of the components illustrated in FIG. 7, but computing device 700 may include interface circuitry for coupling to the one or more components. For example, computing device 700 may not include a display device 703, but may include display device interface circuitry (e.g., a connector and driver circuitry) to which display device 703 may be coupled.

Computing device 700 may include a processing device 701 (e.g., one or more processing devices). As used herein, the term processing device or processor indicates a device that processes electronic data from registers and/or memory to transform that electronic data into other electronic data that may be stored in registers and/or memory. Processing device 701 may include a memory 721, a communication device 722, a refrigeration/active cooling device 723, a battery/power regulation device 724, logic 725, interconnects 726, a heat regulation device 727, and a hardware security device 728.

Processing device 701 may include one or more digital signal processors (DSPs), application-specific integrated circuits (ASICs), central processing units (CPUs), graphics processing units (GPUs), cryptoprocessors (specialized processors that execute cryptographic algorithms within hardware), server processors, or any other suitable compute units.

Processing device 701 may include a memory 702, which may itself include one or more memory devices such as volatile memory (e.g., dynamic random-access memory (DRAM)), nonvolatile memory (e.g., read-only memory (ROM)), flash memory, solid state memory, and/or a hard drive. In some embodiments, processing device 701 shares a package with memory 702. This memory may be used as cache memory and may include embedded dynamic random-access memory (eDRAM) or spin transfer torque magnetic random-access memory (STT-M RAM).

Computing device 700 may include a heat regulation/refrigeration device 723. Heat regulation/refrigeration device 723 may maintain processing device 701 (and/or other components of computing device 700) at a predetermined low temperature during operation. This predetermined low temperature may be any temperature discussed elsewhere herein.

In some embodiments, computing device 700 may include a communication chip 707 (e.g., one or more communication chips). For example, the communication chip 707 may be configured for managing wireless communications for the transfer of data to and from computing device 700. The term "wireless" and its derivatives may be used to describe circuits, devices, systems, methods, techniques, communications channels, etc., that may communicate data through the use of modulated electromagnetic radiation through a nonsolid medium.

Computing device 700 includes PIC 615, for example having a CMZI interleaver, for example including one or more of the features described elsewhere herein. PIC 615 may facilitate communication between one or more instances of processing device 701 and/or one or more instances of memory 702, for example.

Computing device 700 may include battery/power circuitry 708. Battery/power circuitry 708 may include one or more energy storage devices (e.g., batteries or capacitors) and/or circuitry for coupling components of computing device 700 to an energy source separate from computing device 700 (e.g., AC line power).

Computing device 700 may include a display device 703 (or corresponding interface circuitry, as discussed above). Display device 703 may include any visual indicators, such as a heads-up display, a computer monitor, a projector, a touchscreen display, a liquid crystal display (LCD), a light-emitting diode display, or a flat panel display, for example.

Computing device 700 may include an audio output device 704 (or corresponding interface circuitry, as discussed above). Audio output device 704 may include any device that generates an audible indicator, such as speakers, headsets, or earbuds, for example.

Computing device 700 may include an audio input device 710 (or corresponding interface circuitry, as discussed above). Audio input device 710 may include any device that generates a signal representative of a sound, such as microphones, microphone arrays, or digital instruments (e.g., instruments having a musical instrument digital interface (MIDI) output).

Computing device 700 may include a global positioning system (GPS) device 709 (or corresponding interface circuitry, as discussed above). GPS device 709 may be in communication with a satellite-based system and may receive a location of computing device 700, as known in the art.

Computing device 700 may include another output device 705 (or corresponding interface circuitry, as discussed above). Examples include an audio codec, a video codec, a printer, a wired or wireless transmitter for providing information to other devices, or an additional storage device.

Computing device 700 may include another input device 711 (or corresponding interface circuitry, as discussed above). Examples may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

Computing device 700 may include a security interface device 712. Security interface device 712 may include any device that provides security measures for computing device 700 such as intrusion detection, biometric validation, security encode or decode, managing access lists, malware detection, or spyware detection.

Computing device 700, or a subset of its components, may have any appropriate form factor, such as a server or other networked computing component, a mobile device, a printer, a scanner, a monitor, a set-top box, an entertainment control unit, a vehicle control unit, a digital camera, a digital video recorder, or a wearable computing device.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that practice of the disclosed techniques and architectures is not limited to the embodiments so described but can be modified and altered without departing from the scope of the appended claims. For example, the above embodiments may include specific combinations of features as further provided below.

In first examples, an apparatus comprises a first Mach-Zehnder interferometer (MZI) structure having a first arm length differential, and a second MZI structure having a second arm length differential that is a multiple of the first arm length differential. The apparatus comprises a first number of electrically resistive heater elements proximal to an arm of the first MZI structure, and a second number of electrically resistive heater elements proximal to an arm of the second MZI structure. The second number of heater elements is approximately equal to the first number of heater elements times the multiple.

In second examples, for any of the first examples individual ones of the first and second number of heater elements are all connected in electrical parallel across a first heater power supply rail and a second heater supply rail.

In third examples, for any of the first through second examples the apparatus comprises a voltage source coupled to the first heater supply rail.

In fourth examples, for any of the first through third examples individual ones of the first and second number of heater elements all have substantially the same resistance value.

In fifth examples, for any of the fourth examples individual ones of the first and second number of heater elements all have substantially the same composition and substantially the same length.

In sixth examples, for any of the first through fifth examples the multiple of the arm length differential is two, the first number of heater elements is one, and the second number of heater elements is two.

In seventh examples, for any of the first through sixth examples the second MZI structure is in a serial cascade with the first MZI structure.

In eighth examples, a cascaded Mach-Zehnder interferometer (CMZI) comprises a first MZI structure. The first MZI structure comprises a first pair of optical waveguides with an optical path length difference of $\Delta L$. The CMZI comprises a plurality of first electrical resistors. One or more of the first resistors, each having a first resistance, are adjacent to each of the first pair of optical waveguides. The CMZI comprises a second MZI structure comprising a second pair of optical waveguides with an optical path length difference of twice $\Delta L$. The CMZI structure comprises a plurality of second electrical resistors. Two or more of the second resistors, each having approximately the first resistance, are adjacent to each of the second pair of optical waveguides.

In ninth examples, for any of the eighth examples all of the first resistors are electrically coupled across a common supply rail and one of a second supply rail or a third supply rail.

In tenth examples, for any of the ninth examples all of the second resistors are electrically coupled across the common heater supply rail and one of the second supply rail or the third supply rail.

In eleventh examples, for any of the eighth through tenth examples the second resistors comprise two pairs of second resistors, each pair of the second resistors adjacent to a corresponding one of the second pair of optical waveguides.

In twelfth examples, for any of the eleventh examples each of the second resistors in each of the pairs of second resistors has approximately the first resistance.

In thirteenth examples, for any of the eleventh through twelfth examples a first pair of the second resistors adjacent to a longer one of the second waveguides are electrically coupled in parallel across the common supply rail and the second supply rail. A second pair of the second resistors adjacent to a shorter one of the second waveguides are electrically coupled in parallel across the common supply rail and the third supply rail.

In fourteenth examples, for any of the thirteenth examples the CMZI structure further comprises a third stage. The third stage comprises a third pair of optical waveguides with a propagation length difference of twice $\Delta L$, and a plurality of third electrical resistors. Two or more of the third resistors, each having approximately the first resistance, are adjacent to each of the third pair of optical waveguides.

In fifteenth examples, for any of the fourteenth examples a first pair of the third resistors adjacent to a shorter one of the third waveguides are coupled in electrical parallel across the common supply rail and the second supply rail. A second pair of the third resistors adjacent to a longer one of the third waveguides are coupled in electrical parallel across the common supply rail and the third supply rail.

In sixteenth examples, for any of the fourteenth through fifteenth examples each of the second resistors and the third resistors has a length approximately equal to a length of each of the first resistors.

In seventeenth examples, a controller comprises an input to receive a control signal, and circuitry to linearly control a heater supply voltage applied in electrical parallel across heater elements of all stages within a cascaded Mach-Zehnder Interferometer (CMZI).

In eighteenth examples, for any of the seventeenth examples the circuitry to linearly control the heater supply voltage comprises circuitry to change a first voltage applied across a first pair of heater supply rails, the rails coupled to resistor elements within each of a first, second and third stage of the CMZI.

In nineteenth examples, for any of the eighteenth examples the first stage of the CMZI comprises one resistor element and wherein the second stage of the CMZI comprises two resistor elements in electrical parallel across the first pair of heater supply rails.

In twentieth examples, for any of the seventeenth through nineteenth examples the heater supply voltage is the only control for tuning the CMZI.

However, the above embodiments are not limited in this regard, and, in various implementations, the above embodiments may include the undertaking of only a subset of such features, undertaking a different order of such features, undertaking a different combination of such features, and/or undertaking additional features than those features explicitly listed. The scope of the disclosed techniques and architectures should therefore be determined with reference to the appended claims, along with the full scope of equivalents to which such claims are entitled.

What is claimed is:

1. An apparatus comprising:
    a first Mach-Zehnder interferometer (MZI) structure having a first arm length differential;
    a second MZI structure having a second arm length differential that is a multiple of the first arm length differential;

a first number of electrically resistive heater elements proximal to an arm of the first MZI structure, wherein the first number of electrically resistive heater elements are to dissipate power through Joule heating to modulate a phase difference associated with the first arm length differential through the thermo-optic effect;

a second number of electrically resistive heater elements proximal to an arm of the second MZI structure, wherein the second number of electrically resistive heater elements are to dissipate power through Joule heating to modulate a phase difference associated with the second arm length differential through the thermo-optic effect, wherein the second number of heater elements is approximately equal to the first number of heater elements times the multiple, and wherein individual ones of the first and second number of resistive heater elements all have substantially the same resistance value.

2. The apparatus of claim 1, wherein individual ones of the first and second number of heater elements are all connected in electrical parallel across a first heater power supply rail and a second heater supply rail.

3. The apparatus of claim 2, further comprising a voltage source coupled to the first heater supply rail.

4. The apparatus of claim 1, wherein individual ones of the first and second number of heater elements all have substantially the same composition and substantially the same length.

5. The apparatus of claim 1, wherein the multiple of the arm length differential is two, the first number of heater elements is one, and the second number of heater elements is two.

6. The apparatus of claim 1, wherein the second MZI structure is in a serial cascade with the first MZI structure.

7. A cascaded Mach-Zehnder interferometer (CMZI) structure, wherein the CMZI structure comprises:

a first Mach-Zehnder interferometer (MZI) structure comprising:

a first pair of optical waveguides with an optical path length difference of $\Delta L$; and a plurality of first electrical resistors, wherein one or more of the first resistors, each having a first resistance, are adjacent to each of the first pair of optical waveguides and are to dissipate power through Joule heating to modulate a phase difference associated with the optical path length difference of the first pair of optical waveguides through the thermo-optic effect; and a second MZI structure comprising:

a second pair of optical waveguides with an optical path length difference of twice $\Delta L$; and a plurality of second electrical resistors, wherein two or more of the second resistors, each having approximately the first resistance, are adjacent to each of the second pair of optical waveguides and are to dissipate power through Joule heating to modulate a phase difference associated with the optical path length difference of the second pair of optical waveguides through the thermo-optic effect.

8. The CMZI structure of claim 7, wherein all of the first resistors are electrically coupled across a common supply rail and one of a second supply rail or a third supply rail.

9. The CMZI structure of claim 8, wherein all of the second resistors are electrically coupled across the common supply rail and one of the second supply rail or the third supply rail.

10. The CMZI structure of claim 8, wherein the second resistors comprise two pairs of second resistors, each pair of the second resistors adjacent to a corresponding one of the second pair of optical waveguides.

11. The CMZI structure of claim 10, wherein each of the second resistors in each of the pairs of second resistors has approximately the first resistance.

12. The CMZI structure of claim 10, wherein a first pair of the second resistors adjacent to a longer one of the second waveguides are electrically coupled in parallel across the common supply rail and the second supply rail, and wherein a second pair of the second resistors adjacent to a shorter one of the second waveguides are electrically coupled in parallel across the common supply rail and the third supply rail.

13. The CMZI structure of claim 12, further comprising a third stage, wherein the third stage comprises:

a third pair of optical waveguides with an optical path length difference of twice $\Delta L$ summed with $\pi/2$; and a plurality of third electrical resistors, wherein two or more of the third resistors, each having approximately the first resistance, are adjacent to each of the third pair of optical waveguides.

14. The CMZI structure of claim 13, wherein a first pair of the third resistors adjacent to a shorter one of the third waveguides are coupled in electrical parallel across the common supply rail and the second supply rail, and wherein a second pair of the third resistors adjacent to a longer one of the third waveguides are coupled in electrical parallel across the common supply rail and the third supply rail.

15. The CMZI structure of claim 14, wherein each of the second resistors and the third resistors has a length approximately equal to a length of each of the first resistors.

* * * * *